United States Patent
Luchansky et al.

(10) Patent No.: US 9,241,497 B2
(45) Date of Patent: Jan. 26, 2016

(54) METHOD AND APPARATUS FOR TREATMENT OF FOOD PRODUCTS

(75) Inventors: John Luchansky, Souderton, PA (US); Neil Goldberg, North Wales, PA (US); Alan Oser, Harleysville, PA (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 2874 days.

(21) Appl. No.: 11/471,327

(22) Filed: Jun. 20, 2006

(65) Prior Publication Data
US 2007/0020366 A1     Jan. 25, 2007

Related U.S. Application Data

(60) Provisional application No. 60/695,859, filed on Jun. 30, 2005.

(51) Int. Cl.
*A23B 4/00* (2006.01)
*A01J 17/00* (2006.01)
*B41F 17/24* (2006.01)
(Continued)

(52) U.S. Cl.
CPC ... *A23B 4/30* (2013.01); *A23B 4/20* (2013.01); *A23B 4/28* (2013.01); *B65B 55/10* (2013.01); *A23N 15/08* (2013.01); *B41F 17/24* (2013.01);
(Continued)

(58) Field of Classification Search
CPC .......... A23N 15/08; A47J 43/24; A47J 27/04; A23B 7/10; A23B 7/144; A23B 4/20; A23L 3/365; A23L 3/3463; A01J 25/118; F25C 1/18; F25D 2331/803; B08B 3/02; B08B 9/093; B08B 9/0936; B08B 9/0804; B41F 17/24; B65B 55/10; B65B 31/006; B67C 3/222; B67C 3/06
USPC .................. 99/516, 536, 534, 483, 467, 473; 426/332, 326, 506, 335; 62/307, 373; 134/34, 166 R, 167 R; 53/111 R, 426, 53/431, 428; 141/48, 92
See application file for complete search history.

(56) References Cited

U.S. PATENT DOCUMENTS 2,982,319 A * 5/1961 Magnuson .................... 141/160
2,993,246 A * 7/1961 Haloski et al. ................ 422/303
(Continued)

FOREIGN PATENT DOCUMENTS

DE        19505239        8/1996
EP        1403184         3/2004

OTHER PUBLICATIONS

U.S. Dept. of Health and Human Services, "Multistate Outbreak of Listeriosis—United States, 1998," *Morbidity and Mortality Weekly Report*, vol. 47, (50), Dec. 25, 1998.
(Continued)

*Primary Examiner* — Dana Ross
*Assistant Examiner* — Hemant Mathew
(74) *Attorney, Agent, or Firm* — John D. Fado; Robert D. Jones; Lesley Shaw

(57) ABSTRACT

Method of treating a food product in a container to reduce or inhibit a microbial population on the food product, involving applying to the container an antimicrobial solution (applied in an amount effective to reduce or inhibit the microbial population), and placing the food product in the container. Also a system for treating food products, involving a bagging system, a spray system, and a rotating assembly for returning a spray wand to a resting position.

14 Claims, 7 Drawing Sheets

(51) Int. Cl.

| | |
|---|---|
| *B65B 9/04* | (2006.01) |
| *A23B 4/30* | (2006.01) |
| *A23B 4/20* | (2006.01) |
| *A23B 4/28* | (2006.01) |
| *B65B 55/10* | (2006.01) |
| *A23N 15/08* | (2006.01) |
| *B67C 3/22* | (2006.01) |
| *B65B 31/00* | (2006.01) |
| *B65B 53/04* | (2006.01) |

(52) U.S. Cl.
CPC .............. *B65B 31/00* (2013.01); *B65B 53/04* (2013.01); *B67C 3/222* (2013.01)

(56) References Cited

U.S. PATENT DOCUMENTS

| | | | | |
|---|---|---|---|---|
| 3,696,584 | A * | 10/1972 | Rickard | 53/239 |
| 4,066,790 | A * | 1/1978 | Connick et al. | 426/8 |
| 4,112,124 | A * | 9/1978 | Jarvis | 426/234 |
| 4,181,743 | A * | 1/1980 | Brumlick et al. | 426/241 |
| 4,254,152 | A * | 3/1981 | Janovtchik | 426/399 |
| 4,342,710 | A * | 8/1982 | Adolfsson et al. | 261/121.1 |
| 4,548,221 | A * | 10/1985 | Abrams | 134/141 |
| 4,604,854 | A * | 8/1986 | Andreas | 53/552 |
| 4,762,060 | A * | 8/1988 | Santa Cruz | 99/483 |
| 4,776,268 | A * | 10/1988 | Bronnert | 99/453 |
| 4,926,614 | A * | 5/1990 | Costello et al. | 53/434 |
| 4,983,411 | A | 1/1991 | Tanaka et al. | |
| 5,339,990 | A * | 8/1994 | Wilder | 222/135 |
| 5,350,568 | A * | 9/1994 | Tuckner et al. | 422/300 |
| 5,374,435 | A * | 12/1994 | Silvestrini et al. | 426/231 |
| 5,405,056 | A * | 4/1995 | Mills | 222/136 |
| 5,422,130 | A | 6/1995 | Fox et al. | |
| 5,462,203 | A * | 10/1995 | Stern | 222/137 |
| 5,573,801 | A | 11/1996 | Wilhoit | |
| 5,690,151 | A * | 11/1997 | Rutter et al. | 141/92 |
| 5,718,161 | A * | 2/1998 | Beadle | 99/276 |
| 5,893,673 | A * | 4/1999 | Edwards | 401/186 |
| 5,931,080 | A * | 8/1999 | Roure Boada | 99/293 |
| 6,103,286 | A | 8/2000 | Gutzmann et al. | |
| 6,113,963 | A | 9/2000 | Gutzmann et al. | |
| 6,216,946 | B1 * | 4/2001 | Cai | 229/400 |
| 6,315,166 | B1 * | 11/2001 | Beck et al. | 222/137 |
| 6,386,443 | B1 * | 5/2002 | Szczerbinski | 229/400 |
| 6,419,153 | B1 * | 7/2002 | Maita | 229/400 |
| 6,509,050 | B1 | 1/2003 | Henson et al. | |
| 6,582,654 | B1 * | 6/2003 | Kral et al. | 422/28 |
| 7,165,733 | B2 * | 1/2007 | Whitefoot et al. | 239/408 |
| 2002/0195131 | A1 * | 12/2002 | Morioka et al. | 134/62 |
| 2003/0189109 | A1 * | 10/2003 | Bardinet et al. | 239/532 |
| 2003/0201000 | A1 * | 10/2003 | Worm et al. | 134/32 |
| 2004/0018284 | A1 | 1/2004 | Kuethe et al. | |
| 2005/0045751 | A1 * | 3/2005 | Nance et al. | 239/587.1 |
| 2005/0150571 | A1 * | 7/2005 | Schmoll | 141/144 |
| 2007/0172561 | A1 | 7/2007 | Hirschey et al. | |
| 2008/0038422 | A1 * | 2/2008 | Hilgren et al. | 426/332 |

OTHER PUBLICATIONS

U.S. Dept. of Health and Human Services, "Multistate Outbreak of Listeriosis—United States, 2000," *Morbidity and Mortality Weekly Report*, vol. 49, (50), Dec. 22, 2000.

Centers for Disease Control and Prevention, "Nonfatal Choking-Related Episodes Among Children—United States, 2001," *Morbidity and Mortality Weekly Report*, vol. 51, (42), Oct. 25, 2002.

Thomsen, M. et al., "Market Incentives for Safe Foods: An Examination of Shareholder Losses from Meat and Poultry Recalls", *Amer. J. Agr. Econ.*, vol. 82, (3), Aug. 2001, pp. 526-538.

Gombas, D., et al., "Survey of Listeria monocytogenes in Ready-to-Eat Foods," *J. of Food Protection*, vol. 66, (4), 2003, pp. 559-569.

Wallace, F., et al., "Recovery Rate of Listeria monocytogenes from Commercially Prepared Frankfurters during Extended Refrigerated Storage," *J. of Food Protection*, vol. 66, (4), 2003, pp. 584-591.

Federal Register Online via GPO Access (wais.access.gpo.gov), Jun. 6, 2003, vol. 68, (109), pp. 34207-34254.

Crozier-Dodson, B., et al., "Process Control Formulating Food Safety: An Overview of Antimicrobial Ingredients," www.FoodSafetyMagazine.com/issues/0412/colprocess0412.htm.

Barmpalia, I., et al., "Control of Listeria monocytogenes on Frankfurters with Antimicrobials in the Formulation and by Dipping in Organic Acid Solutions," *J. of Food Protection*, vol. 67, 11, pp. 2456-2464, 2004.

Bedie, G., et al., "Antimicrobials in the Formulation to Control Listeria monocytogenes Postprocessing Contamination on Frankfurters Stored at 4° C. in Vacuum Packages", *J. of Food Protection*, vol. 64, (12), pp. 1949-1955, 2001.

Mbandi, E., et al., "Enhanced Inhibition of Listeria monocytogenes and *Salmonella Enteritidis* in Meat by Combinations of Sodium Lactate and Diacetate," *J. of Food Protection*, vol. 64, (5), pp. 640-644, 2001.

Porto, A., et al., "Viability of a Five-Strain Mixture of Listeria monocytogenes in Vacuum-Sealed Packages of Frankfuters, Commercially Prepared with and without 2.0 or 3.0% Added Potassium Lactate, during Extended Storage at 4 and 10° C.," *J. of Food Protection*, vol. 65, (2), pp. 308-315, 2002.

Seman, D.L, et al., "Modeling the Growth of Listeria monocytogenes in Cured Ready-to-Eat Processed Meat Products by Manipulation of Sodium Chloride, Sodium Diacetate Potassium Lactate, and Product Moisture Content," *J. of Food Protection*, vol. 65, (4), pp. 651-658, 2002.

Castillo, A., et al., "Reduction of *Escherichia coli* 0157:H7 and *Salmonella Typhimurium* on Beef Carcass Surfaces Using Acidified Sodium Chlorite", *J. of Food Protection*, vol. 62, (6), pp. 580-584, 1999.

Luchansky, J., et al., "Hot Water Postprocess Pasteurization of Cook-in-Bag Turkey Breast Treated with and without Potassium Lactate and Sodium Diacetate and Acidified Sodium Chlorite for Control of Listeria monocytogenes," *J. of Food Protection*, vol. 69, (1), pp. 39-46, 2006.

Nunez, M., et al., "Effectiveness of Acidic Calcium Sulfate with Propionic and Lactic Acid and Lactates as Postprocessing Dipping Solutions to Control Listeria monocytogenes on Frankfurters with or without Potassium Lactate and Stored Vacuum Packaged at 3.5° C.," *J. of Food Protection*, vol. 67, pp. 915-921, 2004.

Keeton, J., et al., "Antimicrobial Effects of Surface Treatments and Ingredients on Cured RTE Meat Products," *Dept. of Animal Science Texas A&M University*, Dec. 2002.

Bakal, G., et al., "The Lowdown on Lauric Arginate," *Excerpted from Food Quality Magazine*, Feb./Mar. 2005.

Porto, A., et al., "Viability of a Five-Strain Mixture of Listeria monocytogenes in Vacuum-Sealed Packages of Frankfurters, Commercially Prepared with and without 2.0 or 3.0% Added Potassium Lactate, during Extended Storage at 4 and 10° C.", *J. of Food Protection*, vol. 65, (2), pp. 308-315, 2002.

Luchansky, J., et al., "Recovery of Listeria monocytogenes from Vacuum-Sealed Packages of Frankfurters: Comparison of the U.S. Department of Agriculture (USDA) Food Safety and Inspection Service Product Composite Enrichment Method, the USDA Agricultural Research Service (ARS) Product Composite Rinse Method, and the USDA-ARS Package Rinse Method," *J. of Food Protection*, vol. 65, (3), pp. 567-570, 2002.

Laboratory Quality Assurance Division, USDA Food Safety and Inspection Service, Office of Public Health Science, pp. 1-20, Aug. 1, 2006.

Levine, P., et al., "Pathogen Testing of Ready-to-Eat Meat and Poultry Products Collected at Federally Inspected Establishments in the United States, 1990 to 1999", *J. of Food Protection*, vol. 64, (8), pp. 1188-1193, 2001.

Luchansky, J., et a., "Evaluation of Nisin-Coated Cellulose Casings for the Control of Listeria monocytogenes Inoculated onto the Surface of Commercially Prepared Frankfurters", *J. of Food Protection*, vol. 67, (5), pp. 1017-1021, 2004.

(56) References Cited

OTHER PUBLICATIONS

Luchansky, J.B., et al., "Viability of Listeria monocytogens on Commercially-Prepared Hams Surface Treated With Acidic Calcium Sulfate and Lauric Arginate and Stored at 4° C.", *Meat Science*, vol. 71, pp. 92-99, 2005.

Stekelenburg, F.K., "Enhanced Inhibition of Listeria monocytogenes in Frankfurter Sausage by the Addition of Potassium Lactate and Sodium Diacetate Mixtures", *Food Microbiology*, vol. 20, pp. 133-137, 2003.

Soderberg, D., "Meat and Meat Products", *Official Methods of Analysis of AOAC International*, 16th Edition, Revision 4, vol. 11, 1998.

Buncic, S., et al., "Individual and Combined Listericidal Effects of Sodium Lactate, Potassium Sorbate, Nisin and Curing Salts at Refrigeration Temperature", *J. of Food Safety*, vol. 15, pp. 247-264, 1995.

McNeal, J., "Meat and Meat Products", *Official Methods of Analysis of AOAC International*, 15th Edition, pp. 931-940, 1990.

U.S. Publication No. 2002/0058094, Akamatsu et al., May 16, 2002.

Luchansky, J.B. et al., Viability of Listeria Monocytogenes on Commercially-Prepared Hams Surface Treated with Acidic Calcium Sulfate and Lauric Arginate and Stored at 4 degrees Celsius, Meat Science, 2005, pp. 92-99, vol. 71.

Bakal, G. et al., The Lowdown on Laruic Arginate, Food Quality Magazine, 2005.

\* cited by examiner

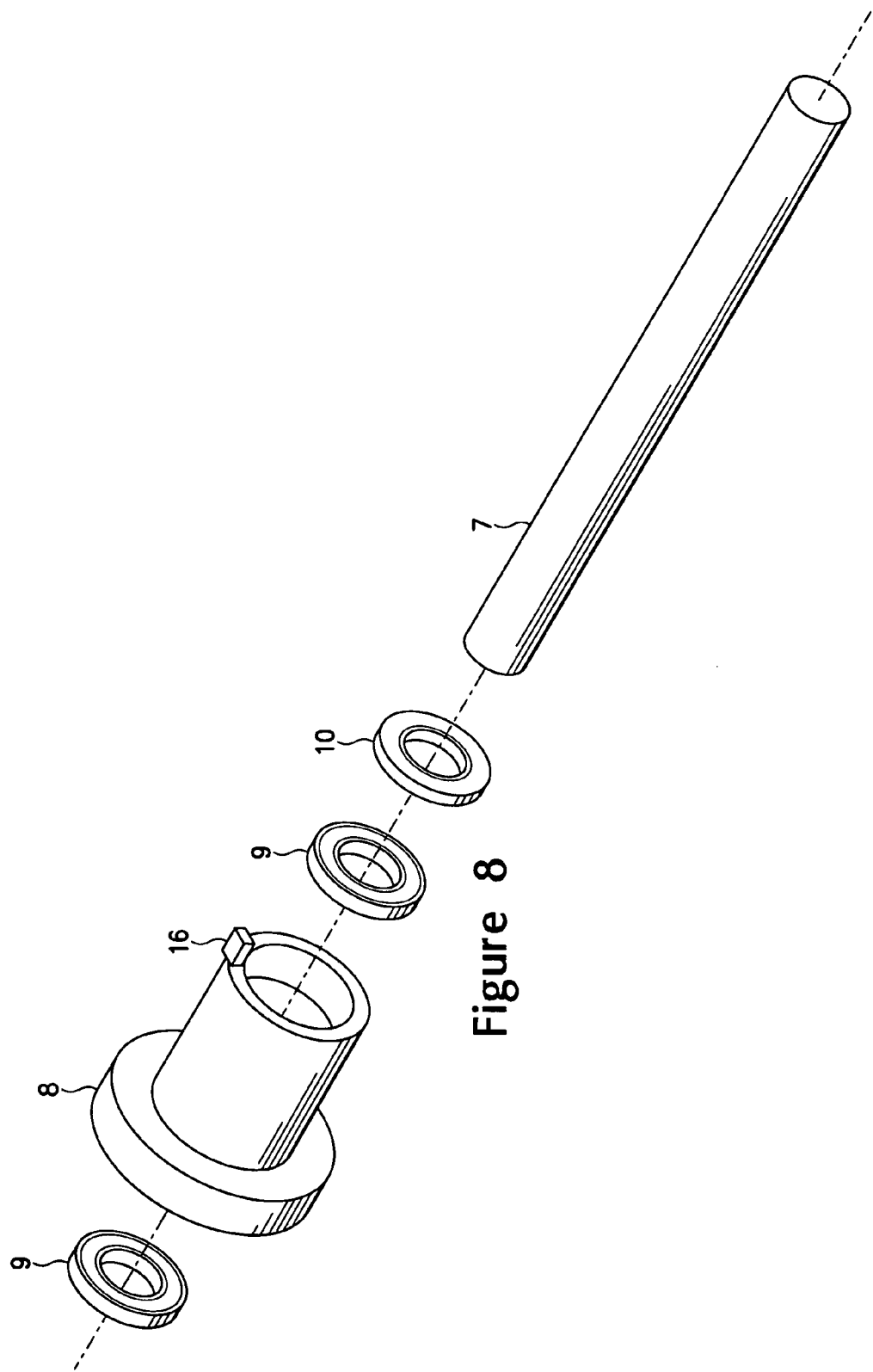

METHOD AND APPARATUS FOR TREATMENT OF FOOD PRODUCTS

REFERENCE TO RELATED APPLICATION

This application claims the benefit of U.S. Provisional Application No. 60/695,859, filed 30 Jun. 2005, which is incorporated herein by reference in its entirety.

BACKGROUND OF THE INVENTION

The present invention relates to a method of treating a food product in a container to reduce or inhibit a microbial population on the food product, involving applying to the container an antimicrobial solution (applied in an amount effective to reduce or inhibit the microbial population), and placing the food product in the container. The present invention also relates to a system for treating food products, involving a bagging system, a spray system, and a rotating assembly for returning a spray wand to a resting position.

Microbial contamination of food remains a major problem in the food processing industry. For example, in recent years there have been at least three large outbreaks of listeriosis in the United States that were associated with ready-to-eat (RTE) frankfurters and/or delicatessen-type meats (Morbidity Mortality Weekly Report, 47: 1085-1086 (1998), 49: 1129-1130 (2000), 51: 950-951 (2002)). During this same time period there have also been several large recalls due to contamination of RTE meat and poultry products with *Listeria monocytogenes*. The economic loss due to recalls of meat and poultry products contaminated with this pathogen alone is estimated at $1.2 to $2.4 billion dollars per year in the United States (Thomsen, M. R., and A. M. McKenzie, American Journal of Agricultural Economics, 82: 526-538 (2001)). In addition, food surveys conducted in the United States between 1990 and 2003 involving ~100,000 samples estimated the prevalence of *L. monocytogenes* at 1.6% to 7.6% in meat, fish, and vegetable products, most of which were RTE foods (Gombas, D. E., et al., Journal of Food Protection, 66: 559-569 (2001); Wallace, F. M., et al., Journal of Food Protection, 66: 584-591 (2003)).

In response to the frequency and magnitude of food recalls, as well as the number and severity of infections, the USDA Food Safety and Inspection Service (USDA/FSIS) established rules/guidelines for RTE meat and poultry manufacturers to better control microbial growth (Federal Register, 68:34207-34254 (2003)). This ruling provides manufacturers with three options for determining the degree to which regulatory testing would be implemented for their plant/product: (1) alternative 1—use of both a post-process lethality step and an antimicrobial to control outgrowth (lowest testing frequency); (2) alternative 2—use of either a post-processing lethality step or an antimicrobial to control outgrowth (moderate testing frequency); or (3) alternative 3—use of appropriate sanitation alone (most testing). These guidelines make it imperative to identify and implement post-process interventions for lethality and/or inhibition of microbes such as *L. monocytogenes* in food products (e.g., RTE meat and poultry products).

Various chemicals are antagonistic towards microbes such as *L. monocytogenes* in foods when used in bath, dip, or spray applications on the meat product and/or when added as an ingredient into the meat product (Crozier-Dodson, B. A., et al., Food Safety Magazine, Jan. 24-27, 2005, pages 75-76). For example, potassium lactate and sodium diacetate used alone or in combination are effective at controlling *L. monocytogenes* in RTE meats (Barmpalia, I. M., et al., International Journal of Food Microbiology, 67: 2456-2464 (2004); Bedie, G. K., et al., Journal of Food Protection, 64: 1949-1955 (2001); Buncic, S., et al., Journal of Food Safety, 15: 247-264 (1995); Mbandi, E., and L. A. Shelef, Journal of Food Protection, 64: 640-644 (2001); Porto, A. C. S., et al., Journal of Food Protection, 65: 308-315 (2002); Seman, D. L., et al., Journal of Food Protection, 65: 651-658 (2003)). Sodium, potassium, and calcium lactates have been approved for use as flavorants, shelf-life extenders, and/or antimicrobials. Acidifiers such as acidified sodium chlorite (ASC) are effective for controlling *L. monocytogenes* on beef carcasses (Castillo, A., et al., Journal of Food Protection 62: 580-584 (1999) and broiler carcasses (Kemp, G. K., et al., Journal of Food Protection, 63: 1087-1092 (2000), as well as on cook-in-bag turkey breast (Luchansky, J. B., and J. E. Call, Hot water post-process pasteurization of cook-in-bag turkey breast treated with and without potassium lactate and sodium diacetate and acidified sodium chlorite for control of *Listeria monocytogenes*, Journal of Food Protection, submitted). Moreover, ASC has been approved as an antimicrobial on processed, comminuted, or formed meat products. Other acidifiers (e.g., acidic calcium sulfate (ACS) which is formulated with organic acids and calcium sulfate) are effective in reducing the levels and controlling the outgrowth of *L. monocytogenes* on the surface of frankfurters during prolonged refrigerated storage (Nunez de Gonzalez, M. T., et al., Journal of Food Protection, 67: 915-921 (2004); Keeton J. T., et al., Antimicrobial effects of surface treatments and ingredients on cured RTE meat products, Final Report: American Meat Institute Foundation, Washington, D.C. (2002)). Currently, ACS is considered GRAS (Generally Recognized As Safe) and is approved for use in meat products. As a final example, in more limited studies, surfactants such as lauric arginate (LAE) were effective at inhibiting growth of *L. monocytogenes* in cooked meats during refrigerated storage (Bakal, G., and A. Diaz, Food Quality, 12(1): 54-61 (2005)). Although the ingredients in LAE have been self-affirmed as GRAS, at present it is not approved for use in meats.

Almost all vacuum packaged meats produce some amount/volume of purge after vacuum packaging. Purge is the fluid that forms while, for example, a RTE product is under vacuum conditions in the package. The fluid comes from internal moisture that is in the meat product which migrates to the area between the surface of the product and the inside of the package. Currently, antimicrobials are directed (e.g., injected) internally into the product prior to processing or applied to the surface of the product during processing. The antimicrobial effect is thus directed to the meat product itself. However, such treatments are not totally effective. Thus there is a need for improved methods for microbial control in packaged food products.

SUMMARY OF THE INVENTION

In accordance with the present invention there is provided a method of treating a food product in a container to reduce or inhibit a microbial population on the food product, involving applying to the container an antimicrobial solution (applied in an amount effective to reduce or inhibit the microbial population), and placing the food product in the container.

Also in accordance with the present invention there is provided a system for treating food products, involving a bagging system, a spray system, and a rotating assembly for returning a spray wand to a resting position.

BRIEF DESCRIPTION OF THE DRAWINGS

FIG. 8 is an exploded view of the hub.

DETAILED DESCRIPTION OF THE INVENTION

Figure 1:
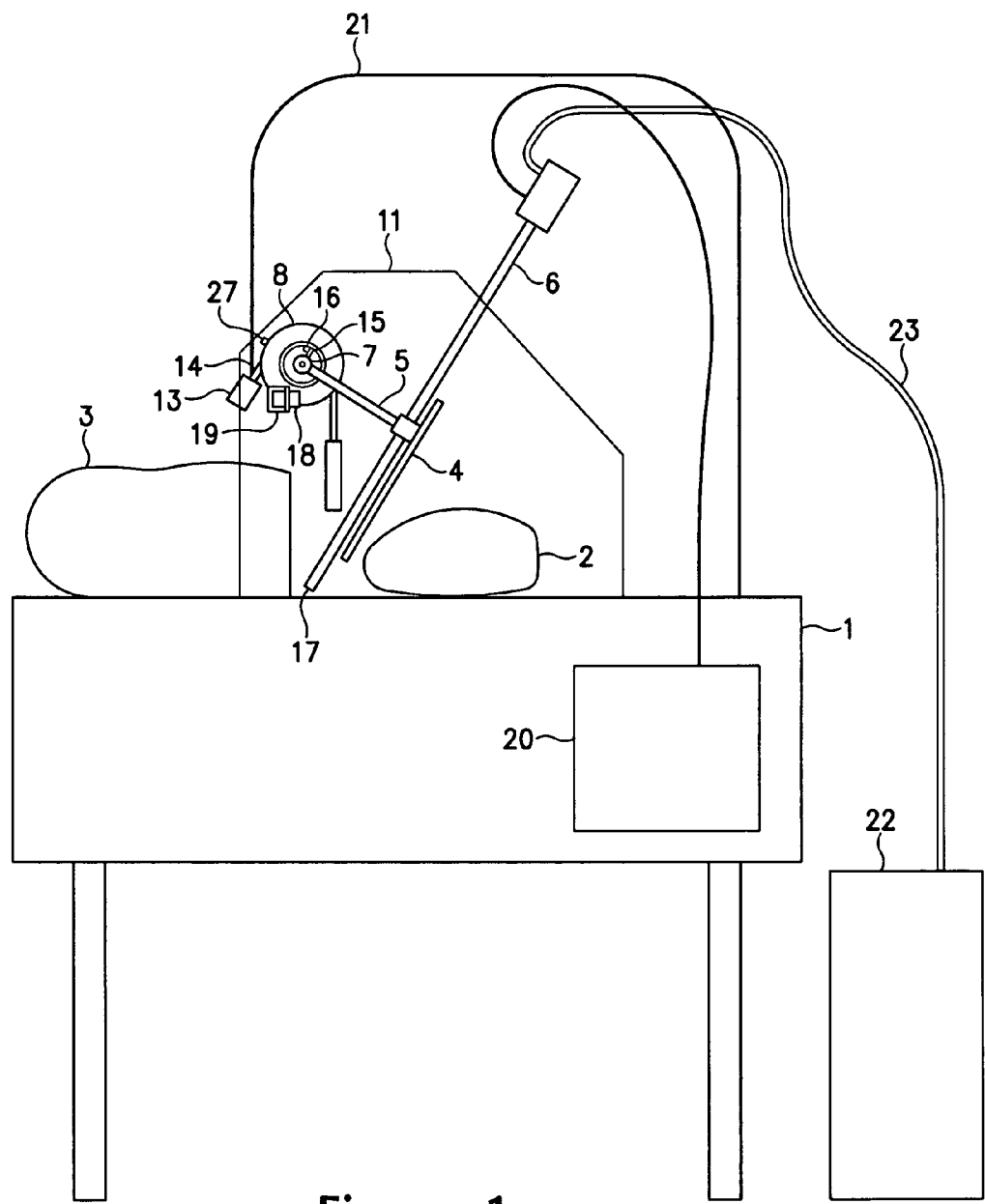
FIG. 1 is a front view of a system for treating food products, involving a bagging system, a spray system, and a rotating assembly in rest (ready for loading position; hidden lines shown).
Figure 2:
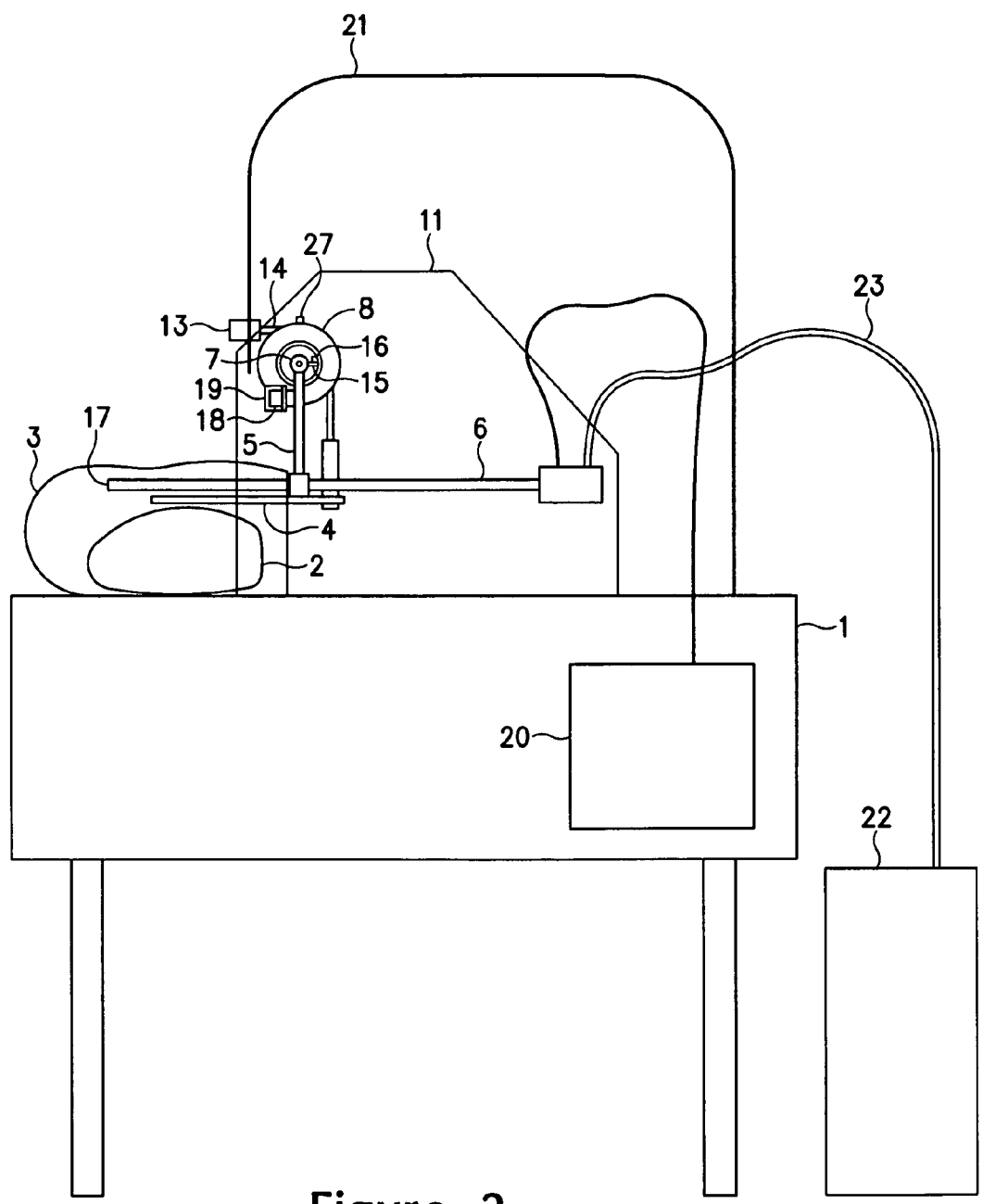
FIG. 2 is a front view of a system for treating food products, involving a bagging system, a spray system, and a rotating assembly in loaded position (hidden lines shown).
Figure 3:
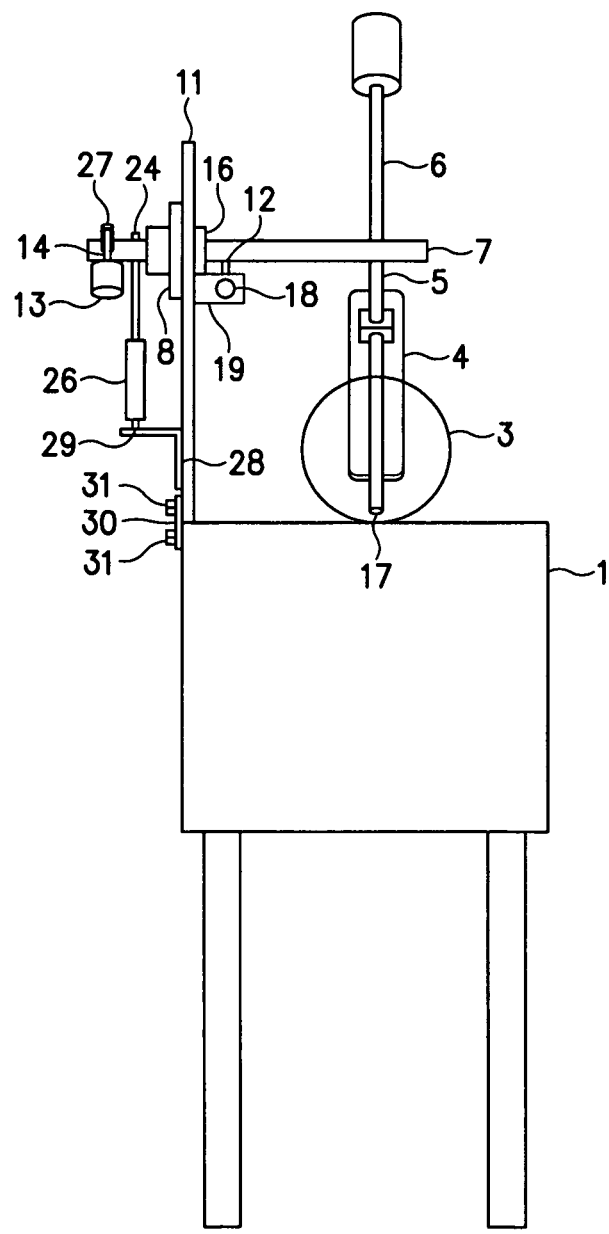
FIG. 3 is a side view of a system for treating food products, involving a bagging system, a spray system, and a rotating assembly (hidden lines hidden).

The present invention concerns a method of treating a food product in a container to reduce or inhibit a microbial population on the food product, involving applying to the container an antimicrobial solution (applied in an amount effective to reduce or inhibit the microbial population), and placing the food product in the container. The present invention also concerns a system for treating food products, involving a bagging system, a spray system, and a rotating assembly for returning a spray wand to a resting position.

The present invention reduces (or eliminates) or inhibits post-processing contaminants on food products. Post-processing contamination is contamination after the food product has been prepared for packaging but before the food product has actually been packaged. Generally, in the present invention, there is no application of antimicrobials to the surface of the product before packaging; optionally there may be application of antimicrobials onto or into the product prior to packaging.

Food products that may be treated using the present invention include vegetables and meat products (e.g., beef, pork, poultry, fish, seafood). Meat products which may be treated using the present invention include, for example, ready-to-eat (RTE) meats and poultry products which include a vast array of products such as bacon, ham (whole or partial), fresh or fermented sausages of all types (such as beef, pork, chicken, turkey, fish, etc.), deli and luncheon meats, hotdogs (frankfurters), bologna and kielbasa type products, delicatessen specialties and pâtés, dried meat and poultry products, such as beef jerky and turkey jerky; and frozen meat and poultry such as pre-cooked frozen beef patties and pre-cooked frozen fried chicken. The term "ready-to-eat meat product" means a meat product that has been processed so that the meat product may be safely consumed without further preparation by the consumer, that is, without cooking or application of some other lethality treatment to destroy pathogens. Thus, unlike other meat products, ready-to-eat meat products are generally consumed without further cooking; therefore, they require that pathogens be rigorously controlled during processing and storage. Meat products that may be treated using the present invention also include uncooked meat products.

An antimicrobial solution is applied (e.g., sprayed) into a container (e.g., bags such as shrink-wrap bags) and the food product is placed in the container. Spraying the antimicrobial solution into the bag and placing the food product into the bag preferably occur simultaneously or almost simultaneously, although they could occur consecutively (e.g., within a few seconds). For example, using the apparatus of the present invention described below, movement of the food product into the bag causes a spray wand to enter the bag and spray the antimicrobial solution into the bag. Each bag is then subjected to a vacuum treatment step in which the bag is vacuum sealed (for example to about 950 mBar using for example a Multivac A300/16 vacuum-packaging unit (Sepp Haggemüller K G, Wolfertschwenden, Germany)) and a heat treatment step where the vacuum sealed bag is then submerged in hot water (e.g., about 88° C.) for about 5 seconds to shrink the bag around the product. The vacuum produced by the packaging system distributes the antimicrobial solution across the surface of the product which kills or inhibits the growth of the targeted pathogens and/or spoilage microbes upon contact. The action of the antimicrobials is thus post-processing, and kills or inhibits the growth of the microbes on the surface of the food product or in the purge which may come out of the food product.

The antimicrobial solution may contain any antimicrobial (e.g., bacteriocidal or bacteriostatic) approved for use in foods for human or animal consumption. Generally, the antimicrobial solution is an aqueous antimicrobial solution. The antimicrobial may be effective against microbes such as molds, yeasts, and/or bacteria (e.g., Gram-negative or Gram-positive pathogenic and/or food spoilage bacteria including *L. monocytogenes, Escherichia coli* such as serotype O157:H7 strains); these microbes are human or animal pathogens or food spoilage organisms.

The concentration of the antimicrobial in the antimicrobial solution applied to the food product in the bag will be a microbial reducing effective amount or a microbial inhibiting effective amount; in other words, an amount that will kill microbes or inhibit the outgrowth of microbes during extended storage (e.g., up to about 60 days) of the food product (generally at about 4° C.). The term "effective amount," as used herein, means the minimum amount of the antimicrobial needed to reduce or inhibit the microbial population in the bag containing the food product when compared to the same bag which is untreated. Of course, the precise amount needed will vary in accordance with the particular antimicrobial used and the food product being treated. The precise amount of the antimicrobial can easily be determined by one skilled in the art given the teaching of this application. For example, one skilled in the art could follow the procedures utilized below. Furthermore, the volume of the antimicrobial solution applied to the food product is generally determined by the surface area of the food product to be treated since it is important that the entire surface area of the food product be treated in order to avoid any "cold spots" that would be lacking antimicrobials while possibly harboring microbes. Surface area (in square inches)=circumference× length; for example, 1 ml of an antimicrobial solution can treat 22 square inches of food product surface.

Generally, a commercial spraying apparatus (e.g., AutoJet Spray System #45570-22-10-120V, Spraying Systems Co., Wheaton, Ill.) and a commercial bagging apparatus (e.g., Taped Bag Loader #BL189, Sealed Air Corp., Cryovac Food Packaging Division, Duncan, S.C.) may be used. Semi-automatic bag loaders index, position and open a string of bags supported by tapes for product insertion by an operator; bags are automatically advanced and inflated. The operator will generally spray the antimicrobial solution into the bag and place the food product into the bag; alternatively, the apparatus of the claimed invention (described below) may be used.

The beneficial economics of using the present invention (see below) and its conservative use of antimicrobials make it a very desirable alternative to other more costly means of potentially assuring the safety of RTE meats. In the present invention, the amount of antimicrobial added to the container (e.g., shrink-wrap bags) is determined by the surface area of the product, as opposed to the random and normally excessive application of antimicrobials used in the spray and bath systems of the prior art. Unlike spray and bath systems of the prior art, the present invention affords the antimicrobial almost unlimited time (that being throughout shelf life in the package) to work against undesirable microorganisms, whereas bath and spray applications are regulated by the time of exposure (usually seconds) of the meat product to the antimicrobial prior to packaging. In addition, in the present invention the antimicrobial is added and active after any opportunity for post packaging contamination is eliminated. The significance of the present invention is not that antimicrobials (e.g., ACS or LAE) display antimicrobial (e.g., antilisterial) activity but rather that the present invention is surprisingly a far more facile, effective, and economical delivery method for antimicrobials than current/traditional techniques.

Regarding economic benefits, the present invention uses specific and much lower doses of an antimicrobial than direct (internal) addition, bathing, and/or spraying. In the present invention, the volume applied to the product is determined by the surface area to be treated to achieve sufficient distribution/coverage; the present invention also eliminates any "cold spots" that would be lacking antimicrobials while possibly harboring microbes. When selecting the volume, consideration must also be given to concerns about flavor and/or texture that may result from the added antimicrobial solution. Regardless, because of the metered dose concept, very small amounts of chemical are used. In general, the cost of applying antimicrobials by bathing, dipping, or spraying can range from $0.02 to $0.03 per pound of product treated, whereas in the present invention costs are estimated to range from $0.002 to $0.009 per pound. More specifically, we estimate that the savings of using the present invention with, for example, LAE and/or ACS compared to using potassium lactate and sodium diacetate as an ingredient would amount to ca. $1,000,000 to 2,000,000 per year for a "large" (USDA/FSIS definition) processing plant. Other advantages of the present invention are a reduced impact on flavor and quality due to its use of comparatively lower volumes of antimicrobials. Also, it is likely that consumers will ingest little or no antimicrobials introduced by the present invention since purge is rarely consumed in any significant quantity by the end user. For all of these reasons, and for its ability to address current USDA/FSIS regulatory guidelines, provide considerable economic benefits to industry, and enhance food safety/quality for consumers, it will be very beneficial for the present invention to be adopted for routine use by manufacturers of RTE meat and poultry products.

As noted above, application of the antimicrobial solution by spray means can be accomplished by a commercial manual spraying apparatus (e.g., AutoJet Spray System #45570-22-10-120V, Spraying Systems Co., Wheaton, Ill.) and a commercial bagging apparatus (e.g., Taped Bag Loader #BL189, Sealed Air Cryovac).

However, the present invention also relates to a system for treating food products involving a bagging system, a spray system, and a rotating assembly (for returning a spray wand to a resting position) which causes an antimicrobial solution to be automatically sprayed into the bag (container) as the food product enters the bag; thus the movement of the food product into the bag automatically causes an antimicrobial solution to be sprayed into the bag. The bagging system generally may be any know bagging apparatus (e.g., Taped Bag Loader #BL189, Sealed Air Corp., Cryovac Food Packaging Division, Duncan, S.C.); the bags utilized by the bagging apparatus may be any known bags (e.g., shrink-wrap bags) suitable for containing food products. The spray system generally may be any known spraying apparatus (e.g., AutoJet Spray System #45570-22-10-120V, Spraying Systems Co., Wheaton, Ill.) and generally involves a sprayer control unit, solution reservoir, and a spray wand operatively connected to the solution reservoir A system for treating food products, incorporating the features of the present invention, is illustrated in FIGS. 1-7. The following description will be directed to treating food products with an antimicrobial solution in a bag.

Figure 4:
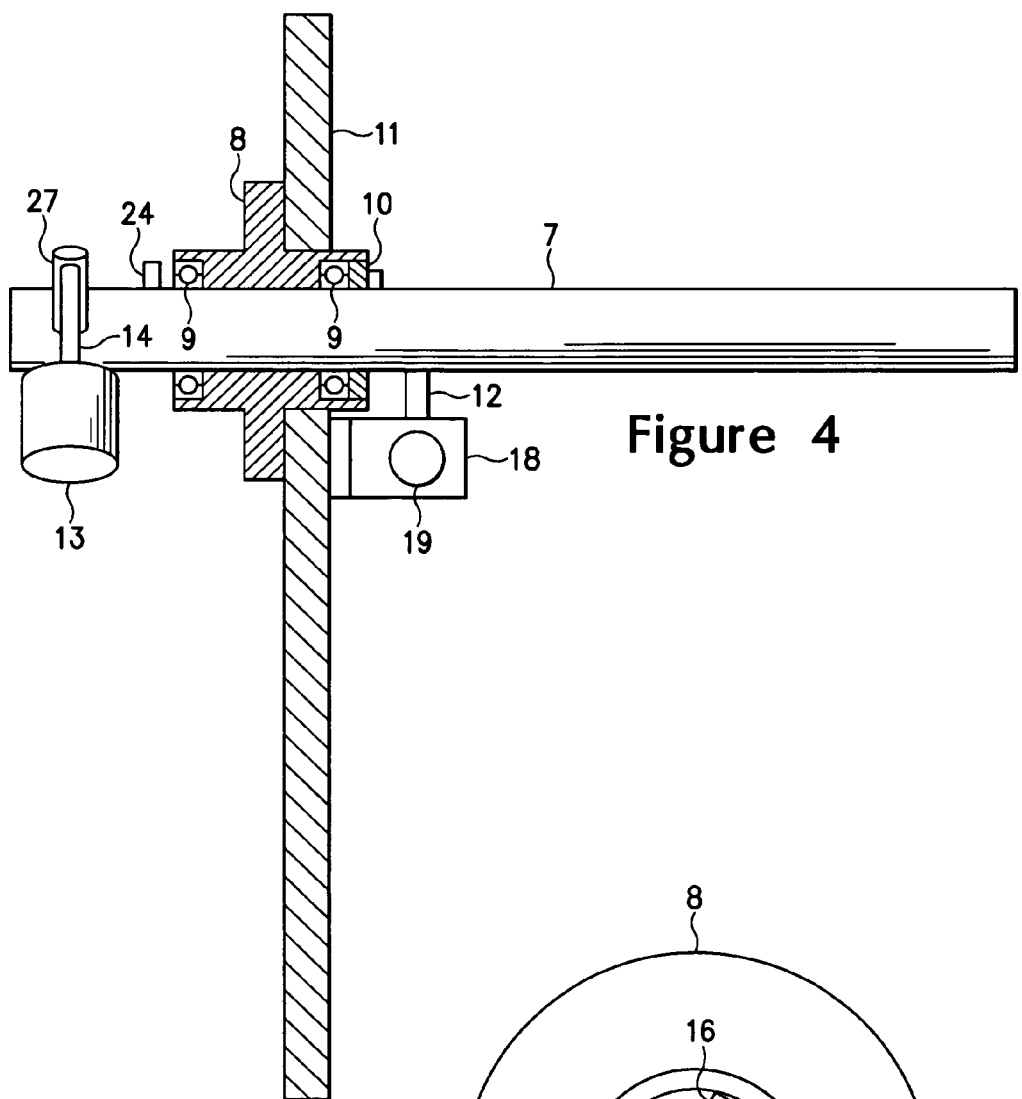
FIG. 4 is a sectional view of hub and rotary shaft of the rotating assembly showing bearings and seal.
Figure 5:
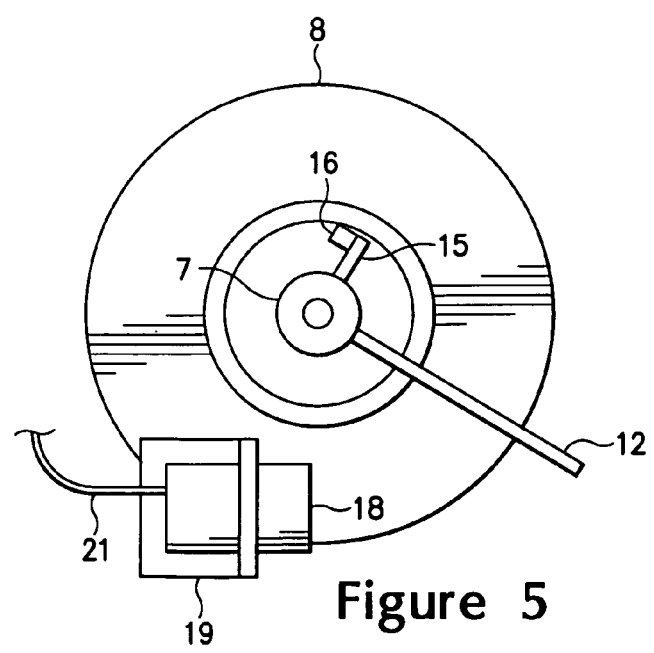
FIG. 5 is a front view detail of hub of the rotating assembly showing trigger and stop assemblies.
Figure 6:
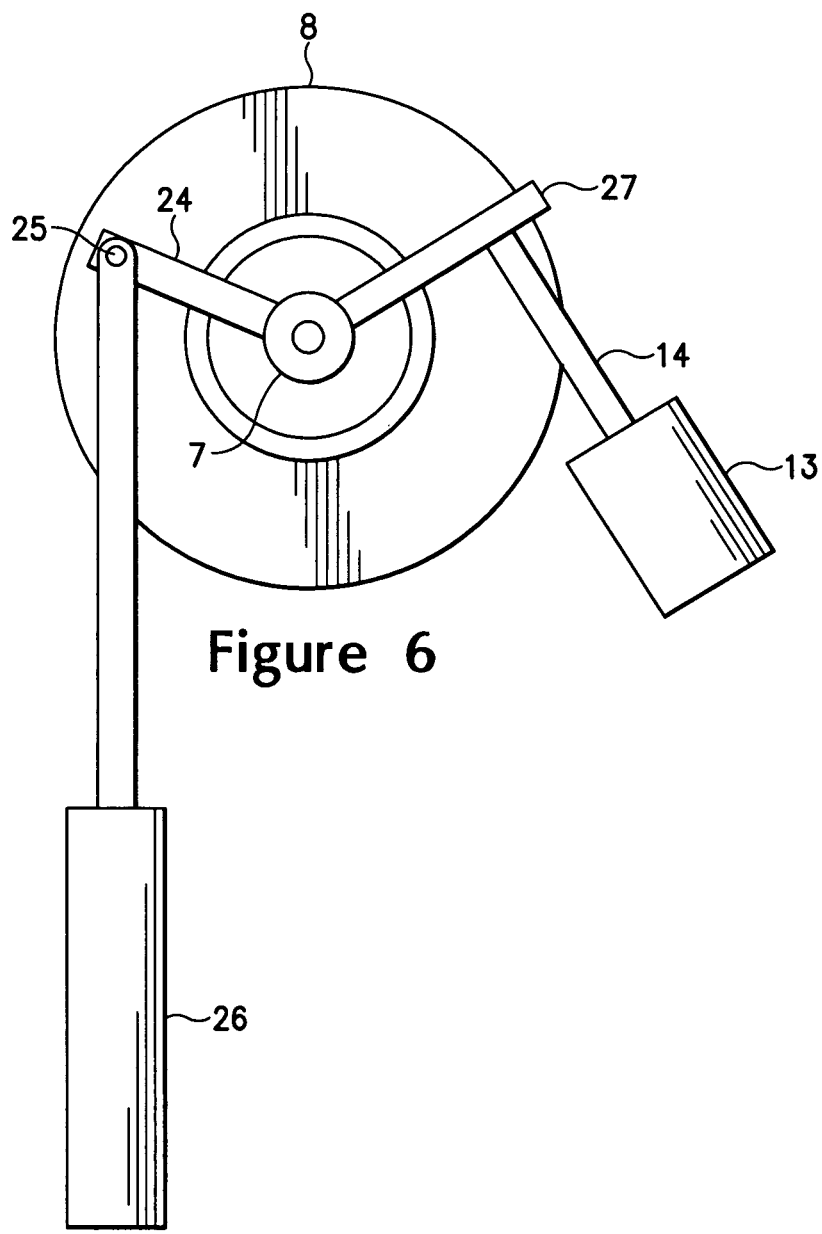
FIG. 6 is a rear view detail of hub of the rotating assembly showing counterweight and return cylinder.
Figure 7:
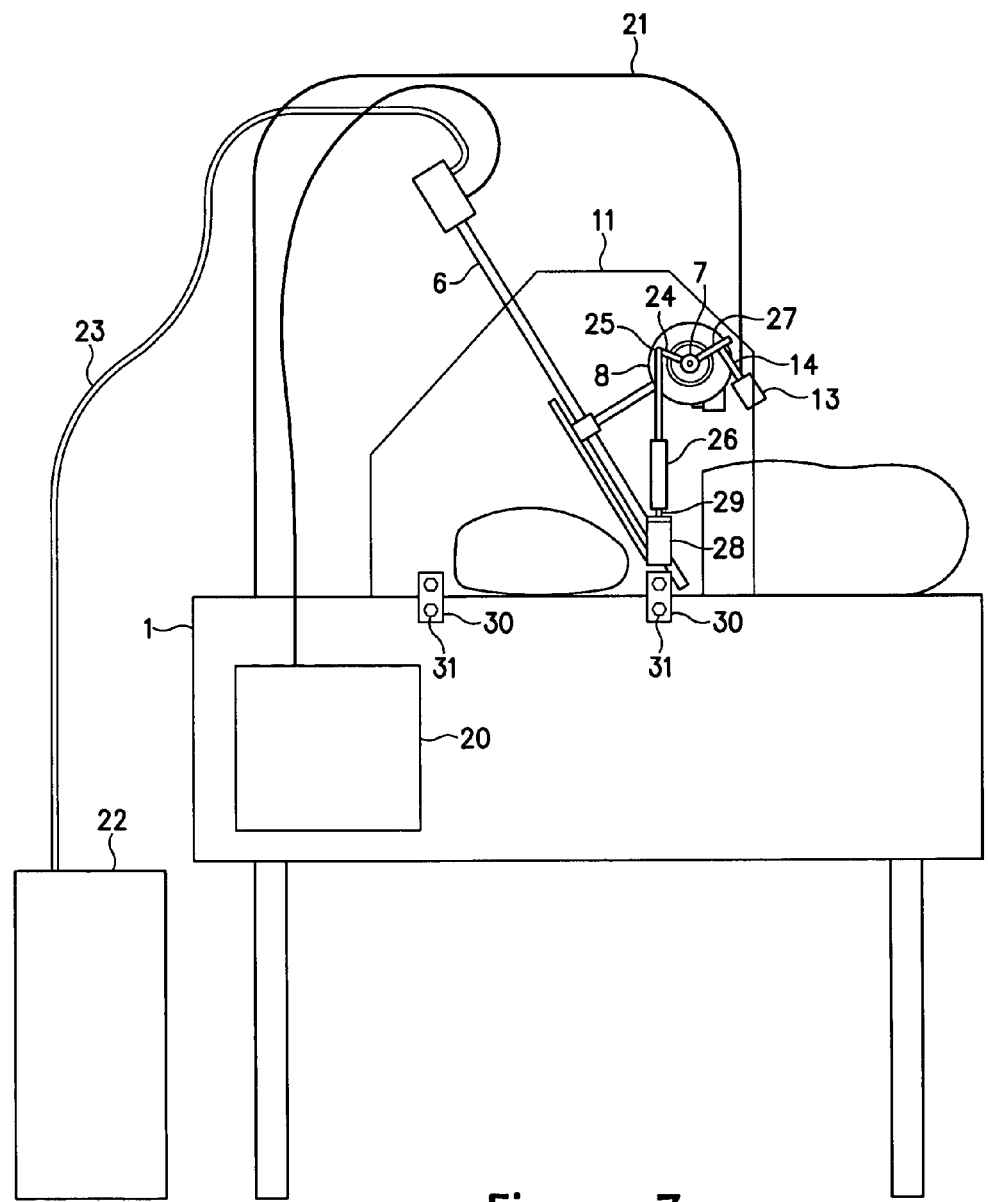
FIG. 7 is a rear view of a system for treating food products, involving a bagging system, a spray system, and a rotating assembly.

FIGS. 1-3 and 7 show a system for treating food products involving a bagging system, a spray system, and a rotating assembly (further described in FIGS. 4-6). Bagging apparatus 1 may be a standard commercial bagging unit (e.g., Taped Bag Loader #BL189, Sealed Air Corp., Cryovac Food Packaging Division, Duncan, S.C.). Product 2 may be a food product (e.g., RTE meat product such as a ham). Bag 3 may be a shrink-wrap plastic bag (available for example from Cryovac Food Packaging Division, Duncan, S.C.). Spray wand 6, which may be a commercial spray wand (e.g., sold by Spraying Systems Co., Wheaton, Ill.), is operatively connected to strike plate 4 and spray wand offset bar 5; for example, spray wand offset bar 5 (e.g., ½" diameter stainless steel bar) terminates in a half clamp (welded to spray wand offset bar 5), strike plate 4 is welded to the other half of the clamp, and the two halves are joined by machine bolts clamping the spray wand 6 in between them (thus spray wand 6 is removable). Strike plate 4 is generally about 2 inches wide and about 8 inches long although the size of strike plate 4 can readily be changed, for example, depending on the size of spray wand 6. Spray wand offset bar 5 is operatively connected to rotary shaft 7 (e.g., spray wand offset bar 5 fits in a hole bored through rotary shaft 7 perpendicular to the rotary axis and is held in place with a pin or lock nut) which is perpendicular to spray wand offset bar 5. Rotary shaft 7 is operatively connected to hub 8 and is free to turn on bearings 9; bearings 9 are supported in hub 8 (see FIG. 8) which is operatively connected to support 11 (e.g., using machine screws, but hub 8 could be welded integral to support 11). Support 11 is perpendicular to the surface of bagging apparatus 1; support 11 may be, for example, a plate or a tube. A seal 10 (e.g., sanitary seal such as lip style or elastomeric bushing) prevents bearing lubricants from contacting product 2 and protects bearings 9 from contamination with cleaning solutions. Support 11 is operatively connected to the back edge of bagging apparatus 1 (e.g., with plate 30 and bolts 31 as shown in FIG. 7). Trigger bar 12 is operatively connected to rotary shaft 7 (for example by welding trigger bar 12 to a collar that is slipped onto rotary shaft 7 or trigger bar 12 could be welded directly to rotary shaft 7) and rotates with it. The counterweight 13 is operatively connected to the rotary shaft 7 via the offset bars 14 and 27 (offset bar 27 is generally perpendicular to rotary shaft 7, offset bar 14 is generally perpendicular to offset bar 27, counterweight 13 is attached to offset bar 14); for example, these are connected either by welding or by one part fitting through a bored hole in the other and held with lock nuts or pins. Trigger bar 12 may be a piece of bar stock stainless steel about ½" wide, about 3/16" thick and about 3" long, stop bar 15 and stop 16 are made of similar material but are shorter in length.

In operation, product 2 is manually placed by the operator on the table surface of bagging apparatus 1. Bag 3 is held open with a stream of air coming from bagging apparatus 1 (not shown). The spray wand 6 is in the rest position in FIG. 1 with the strike plate 4 obstructing the opening of the bag 3; generally when spray wand 6 is in the rest position it is at an approximately 45 degree angle relative to rotary shaft 7 (the angle is approximately 45 degrees relative to horizontal). Spray wand 6 and strike plate 4 are held in the rest position by the weight of the counterweight 13 and its offset bars 14 and 27 acting through the rotary shaft 7. The action of the counterweight is limited to the rest position because stop bar 15 which rotates with rotary shaft 7 contacts stop 16 which is attached to hub 8. Spray wand 6, strike plate 4, spray wand offset bar 5, counterweight 13, offset bars 14 and 27, and stop bar 15 are all operatively connected to rotary shaft 7 and move in concert. Stop 16 and hub 8 are fixed to the support 11 and do not rotate.

As the operator manually pushes the product 2 into the bag 3, the product 2 contacts the strike plate 4. As the product 2 enters the bag 3 the strike plate 4 and spray wand 6 rotate through a tangential arc entering the bag 3 above the product 2 with the wand nozzle 17 deep into the bag 3. The counterweight 13 rotates through a similar tangential arc causing a balanced motion throughout the full range of rotation. When spray wand 6 is in the loaded position (FIG. 2) strike plate 4 is horizontal and product 2 is in bag 3 below it. Once product 2 stops moving into bag 3 there is no force that will cause spray wand 6 to continue moving, and counterweight 13 (or pneumatic cylinder 26) is biased to the rest position. Trigger bar 12 rotates with rotary shaft 7 and triggers sensor 18. Sensor 18 is operatively connected to support 11 by bracket 19. Sensor 18 is triggered optically, but could be a proximity, mechanical or any other known sensor that remotely closes the trigger contact of sprayer control unit 20 via wire 21. When sensor 18 is triggered, sprayer control unit 20 dispenses a metered amount of the antimicrobial solution from solution reservoir 22 through flexible tube 23. Generally, sprayer control unit 20, solution reservoir 22, and flexible tube 23 are part of a commercial manual spraying apparatus (e.g., AutoJet Spray System #45570-22-10-120V, Spraying Systems Co., Wheaton, Ill.). Solution reservoir 22 is pressurized with air to provide the discharge pressure to nozzle 17. Bag 3 containing product 2 and the antimicrobial solution is then manually removed by the operator from bagging apparatus 1 for the vacuum treatment and heat treatment steps (described above). Spray wand 6, strike plate 4, trigger bar 12 and other rotating parts return to the rest position as counterweight 13 is slightly biased to the rest position. Sprayer control unit 20 is reset for the next loading sequence.

As an alternative to use of counterweight 13, bellcrank 24 may be operatively connected to rotary shaft 7 and operatively connected via a clevis pin 25 to pneumatic cylinder 26. The other end of pneumatic cylinder 26 is operatively connected to support 11 via bracket 28 and pin 29. Pneumatic cylinder 26 is double acting with constant air pressure to both sides, but with a slightly higher pressure to the side returning the rotary assembly to the rest position. This arrangement serves the identical purpose as counterweight 13, but conserves space and dampens the motion somewhat. Other variations to the return mechanism could include a constant torque slip clutch or similar device.

Components of rotating assembly include the following: strike plate 4, spray wand offset bar 5, rotary shaft 7, hub 8, and support 11. The rotating assembly can also include the following: trigger bar 12, counterweight 13, offset bar 14 and 27, stop bar 15, stop 16, sensor 18, bracket 19, plate 30, bolts 31; as an alternative to counterweight 13 there is pneumatic cylinder 26, bellcrank 25, clevis pin 25.

Many of the components described above are made of stainless steel (300 series).

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

We investigated the lethality of various concentrations and application volumes of ACS and LAE applied via the present invention towards *L. monocytogenes* inoculated onto the surface of hams and the efficacy of these two compounds to control outgrowth during refrigerated storage.

Bacterial Strains: Using a procedure described previously (Porto, A. C. S., et al., Journal of Food Protection, 65: 308-315 (2002)), approximately equal numbers of each of the following five strains of *L. monocytogenes* were used as a cocktail in this study: (i) Scott A (serotype 4b, clinical isolate); (ii) H7776 (serotype 4b, frankfurter isolate); (iii) LM-101M (serotype-4b, beef and pork sausage isolate); (iv) F6854 (serotype 1/2a, turkey frankfurter isolate); and (v) MFS-2 (serotype 1/2a, environmental isolate from a pork processing plant). For each experiment isolates were passed twice in brain heart infusion (BHI; Difco Laboratories, Detroit, Mich.) broth at 37° C. so that cells would be in the stationary phase for inoculating hams. Stock cultures were maintained by storage in BHI plus 10% (wt/vol) glycerol in 1.5-ml portions in cryovials and held at −80° C.

Lethality Studies: To evaluate the lethality of acidic calcium sulfate (ACS; Safe$_2$O-RTE 01, Mionix Corp., Naperville, Ill.) and lauramide arginine ester (LAE; Ethyl-N-dodecanoyl-L-arginate hydrochloride; CAS No. 60372-77-2; Mirenat-N, Vedeqsa, Barcelona, Spain; also known as lauric arginate), "table brown" hams (water, ground ham trims, brine, dextrose, sugar, sodium phosphate, sodium erythorbate, and sodium nitrite; ca. 3 pounds each ham) were processed and vacuum-sealed by a commercial processor (Hatfield Quality Meats, Hatfield, Pa.). The hams were boxed, transported back to the laboratory, and stored at 4° C. for up to 7 days. Each ham was aseptically removed from its original packaging, spot inoculated with 2 mL of the cocktail using a pipette to achieve a target level of ca. 7.0 log$_{10}$ CFU per ham, and then transferred to a high-performance shrink-wrap bag (B2570T, Cryovac, Duncan, S.C.). Just prior to introducing the hams, the inside of each shrink-wrap bag was sprayed with 0, 2, 4, 6, or 8 mL of either a 1:1 (1 part ACS: 1 part dH$_2$O) or 1:2 (1 part ACS:2 parts dH$_2$O) solution of ACS or a 5% (5 parts LAE:95 parts dH$_2$O) or 10% (10 parts LAE:90 parts dH$_2$O) solution of LAE. The antimicrobials for these experiments were introduced via a 24-ounce plastic spray bottle (Koch Supplies, Kansas City, Mo.). Each bag was then vacuum sealed to 950 mBar using a Multivac A300/16 vacuum-packaging unit (Sepp Haggemüller K G, Wolfertschwenden, Germany), submerged in hot (88° C.) water for approximately 5 seconds to shrink the bag, and transferred to a 4° C. incubator and held for 24 h. In a single trial, three hams were analyzed for each concentration and volume of ACS and LAE tested after 24 h of refrigerated storage.

Validation Studies: To validate the initial post-process lethality of ACS and LAE, a fresh batch of the same formulation of hams was obtained from the same commercial manufacturer as described previously. The hams were spot inoculated with 2 mL of the *L. monocytogenes* cocktail to achieve a target level of ca. 7.0 $\log_{10}$ CFU per ham, transferred to shrink-wrap bags (Cryovac) that were previously sprayed on the inside with 0, 2.5, 4.5, or 6.5 mL of a 1:2 solution of ACS or a 5% solution of LAE, vacuum sealed, submerged in hot (88° C.) water, and placed at 4° C. In each of three trials, three hams were analyzed at each concentration and volume of ACS and LAE tested after 24 h of refrigerated storage.

Shelf-Life Studies: To evaluate the efficacy of ACS and LAE over the expected refrigerated shelf life of the product, a fresh batch of the same formulation of hams was obtained from the same commercial manufacturer as described previously. For these studies, hams were spot inoculated with 2 mL of the *L. monocytogenes* cocktail to achieve a target level of either 3.0 or 7.0 $\log_{10}$ CFU per ham. At each inoculation level one portion of the hams was transferred to shrink-wrap bags that were previously sprayed on the inside with 4, 6, or 8 mL of a 1:2 solution of ACS applied using a commercial spraying apparatus (AutoJet Spray System #45570-22-10-120V, Spraying Systems Co., Wheaton, Ill.) and commercial bagging apparatus (Taped Bag Loader #BL189, Cryovac). An otherwise similar portion of the inoculated hams was transferred to shrink-wrap bags that just prior to introduction of the hams were sprayed with 4, 6, or 8 mL of a 5% LAE solution using the commercial spraying and bagging apparatus. Control hams were also spot inoculated with either 3.0 or 7.0 $\log_{10}$ CFU of *L. monocytogenes* per ham and were transferred to shrink-wrap bags that were not sprayed with either compound. As described previously, hams were vacuum-sealed, submerged in hot (88° C.) water, and stored at 4° C. Hams were analyzed 1, 7, 14, 21, 28, 40, and, 60 days post-inoculation. For each of two trials, three hams were analyzed at each sampling point for both inoculation levels and for both chemicals tested.

Microbiological Analyses: Surviving *L. monocytogenes* were enumerated using the USDA/ARS package rinse method (Luchansky J. B., et al., Journal of Food Protection, 65: 567-570 (2002)) and spread-plating 250 uL of the resulting rinse fluid or dilutions thereof onto duplicate modified Oxford agar plates (MOX; Cook, L. V., Isolation and identification of *Listeria monocytogenes* from red meat, poultry, egg, and environmental samples, Chapter 8, In: USDA/FSIS Microbiology Laboratory Guidebook (3rd ed., Revision 2), Washington, D.C. (1999)) using a sterile cell spreader and incubating for 48 h at 37° C. *Listeria* numbers were expressed as $\log_{10}$ CFU per ham with each package containing a single ham; the detection limit was 1.48 $\log_{10}$ CFU/ham. Periodically, isolates were retained from randomly selected samples and confirmed as *L. monocytogenes* following the recommended/standard USDA/FSIS protocol (Cook, 1999).

Chemical Analyses: The pH of the rinsate obtained from washing the contents of representative packages was determined using a Corning model 3-in-1 combination electrode and model 340 meter (Corning Inc., Corning, N.Y.). The pH was determined for control and experimental samples for the validation and shelf life components of this study. The batch-to-batch variation in formulation was evaluated by testing a randomly selected ham from each of five production batches. The proximate composition of representative hams was determined using methods approved and described by the Association of Official Analytical Chemists (McNeal, J. E., Meat and meat products, In: Herlich, K., Official Methods of Analysis, (15th ed., pp. 931-938), Arlington, Va.: Association of Official Analytical Chemists (1990)) as conducted by a commercial testing laboratory.

Statistical Analyses: Data were analyzed using version 8.0 of the SAS statistical package (SAS Institute, Inc., Cary, N.C.). Analysis of covariance was performed to evaluate the effect of type, concentration, and volume of antimicrobials on the initial lethality and the subsequent ability of ACS and LAE to control the outgrowth of *L. monocytogenes* during extended storage at 4° C. Results are reported as statistically significant at the level of P>0.05.

Proximate Composition: Chemical analyses (Table 1) revealed significant (P>0.05) variations among NaCl, fat, carbohydrate, lactic acid, and nitrite levels among the samples representing the five production batches of the same formulation of ham, but did not reveal appreciable differences in levels of the other chemicals assayed. These data reveal considerable batch-to-batch variation for this type of ham.

Lethality Studies: A five-strain cocktail (ca. 7.0 $\log_{10}$ CFU per ham) was used to evaluate the initial lethality of ACS and LAE towards *L. monocytogenes* on hams. Relative to samples that were not treated with ACS, *L. monocytogenes* levels decreased within 24 h at 4° C. by ca. 1.2, 1.6, 2.4, and 3.1 $\log_{10}$ CFU/ham in samples treated with 2, 4, 6, and 8 mL of a 1:1 solution of ACS and 0.7, 1.6, 2.2, and 2.6 $\log_{10}$ CFU/ham in samples treated with 2, 4, 6, and 8 mL of a 1:2 solution of ACS (Table 2). In general, the larger the volume and the higher the concentration of ACS applied, the greater the decrease in *L. monocytogenes* levels on hams that were stored at 4° C. for 24 h. Regardless, there was not an appreciable difference (P<0.05) in lethality between a 1:1 and a 1:2 solution of ACS at any of the four volumes applied.

In samples treated with LAE (Table 2), *L. monocytogenes* levels decreased by ca. 3.3, 6.5, 5.6, and 6.5 $\log_{10}$ CFU/ham in hams that received 2, 4, 6, and 8 mL of a 5% solution of LAE. In hams that were treated with a 10% solution of LAE, pathogen levels decreased by ca. 6.5 $\log_{10}$ CFU/ham for all 4 application volumes tested. With the exception of the 2 mL application volume of the 5% LAE solution, there was no statistical difference in lethality between the two concentrations of LAE. However, the lethality achieved with either concentration of LAE was significantly greater (P>0.05) than that which was achieved with either concentration of ACS, regardless of the application volume.

Validation Studies: Based on the results of the prefatory experiments detailed in the previous section, we validated the strategy for delivery of ACS and LAE to control *L. monocytogenes* on hams. In three individual validation experiments, each ham was surface inoculated with ca. 7.0 $\log_{10}$ CFU of *L. monocytogenes* and treated with either a 5% solution of LAE or a 1:2 solution of ACS; when used at a concentration of 1:1, ACS adversely affected product taste (data not shown). Use of a 5% solution of LAE was equivalent in cost to use of a 1:2 solution of ACS. After 24 h at 4° C., on average pathogen levels decreased by ca. 1.0, 1.5, and 2.5 $\log_{10}$ CFU/ham in product treated with 2.5, 4.5, and 6.5 mL of a 1:2 solution of ACS and by ca. 4.6, 5.9, and 6.1 $\log_{10}$ CFU/ham in product treated with 2.5, 4.5, and 6.5 mL of a 5% solution of LAE compared to otherwise similar control hams that were not treated with an antimicrobial (Table 3). These data validate the post-process lethality of both ACS and LAE towards *L. monocytogenes*. At all volumes tested, LAE caused a significantly greater reduction in levels of *L. monocytogenes* than ACS. Although the results were not different statistically at the level of P>0.05, in general we observed greater reductions in pathogen levels with larger volumes of both ACS and LAE. Lastly, after 24 h at 4° C., the pH of the rinse fluid recovered from hams treated with a 1:2 solution of ACS (pH 5.25 to 5.77) was statistically (P>0.05) lower than the pH of the rinse fluid recovered from hams treated with a 5% solution of LAE (pH 6.34 to 6.36) or from rinse fluid recovered from control hams that were not treated with either compound (pH 6.28; data not shown).

Shelf-Life Studies: Another objective of this study was to establish if ACS and/or LAE when delivered via the present invention would inhibit outgrowth of L. monocytogenes during the expected shelf life of the product. In shelf-life studies using an initial inoculum of ca. 7.0 $\log_{10}$ CFU/ham, pathogen levels were reduced after 24 h at 4° C. by ca. 1.2, 1.5, and 2.0 $\log_{10}$ CFU/ham and 5.1, 5.4, and 5.5 $\log_{10}$ CFU/ham in samples treated with 4, 6 and 8 mL of a 1:2 solution of ACS and a 5% solution of LAE, respectively, relative to samples that were not treated with either antimicrobial (Table 4). Thereafter, pathogen levels increased by ca. 4.6, 3.0, and 2.0 $\log_{10}$ CFU/ham within 60 days in samples treated with 4, 6, and 8 mL of a 5% solution of LAE. In contrast, levels of L. monocytogenes decreased by ca. 0.5 and 1.0 $\log_{10}$ CFU/ham in product treated with 6 and 8 mL of a 1:2 solution of ACS within 60 days but increased by ca. 0.5 $\log_{10}$ CFU/ham in product treated with 4 mL. In hams that were not treated with either compound, L. monocytogenes levels increased by ca. 2.1 $\log_{10}$ CFU/ham within 60 days. Statistical analyses confirmed that from day 1 through day 60 for all volumes of ACS and LAE tested, levels of L. monocytogenes were appreciably lower for hams that were treated with these antimicrobials compared to control hams that were not treated. In addition, through about 28 days of refrigerated storage pathogen levels were significantly lower in samples treated with LAE compared to samples treated with ACS for all application volumes tested. However, after 60 days there was no significant difference in levels of L. monocytogenes between samples treated with ACS or LAE. Lastly, after 24 h at 4° C., the pH of the rinse fluid recovered from hams treated with a 1:2 solution of ACS (pH 5.14 to 5.49) was significantly lower than the pH of the rinse fluid recovered from hams treated with a 5% solution of LAE (pH 6.21 to 6.33) or from rinse fluid recovered from hams that were not treated with either compound (pH 6.36). However, the pH of the rinse fluid for both the experimental and control hams was ca. pH 6.0 after 60 days of refrigerated storage (data not shown).

In shelf-life studies using an initial inoculum of ca. 3.0 $\log_{10}$ CFU/ham, L. monocytogenes levels were reduced by ca. 1.3, 1.9, and 1.8 within 24 h at 4° C. in samples treated with 4, 6, and 8 mL of a 1:2 solution of ACS, respectively, compared to control hams that were not treated (Table 5). Likewise, levels of the pathogen were reduced to below the limit of detection in the presence of 4, 6, and 8 mL of a 5% solution of LAE within 24 h at 4° C. After 60 days at 4° C., pathogen levels remained relatively unchanged (+/−0.3 $\log_{10}$ CFU/ham) in hams treated with 4, 6 and 8 mL of a 1:2 solution of ACS. However, after 60 days at 4° C. levels of L. monocytogenes increased by ca. 2.0 $\log_{10}$ CFU/ham in samples treated with 4 and 6 mL of a 5% LAE solution but remained below the detection limit on samples treated with 8 mL of this antimicrobial. Statistical analyses of these data confirmed that from day 1 through day 40 for all volumes of ACS and LAE tested levels of L. monocytogenes were appreciably lower for hams that were treated with these antimicrobials compared to control hams that were not treated. Statistical analyses also confirmed that between day 1 and day 40 of refrigerated storage there were no appreciable differences between ACS and LAE at the application volumes tested, nor were there any appreciable differences among any of the volumes tested for either ACS or LAE. Likewise, after 60 days, with the exception of samples treated with 4 or 6 mL of a 5% solution of LAE, all other treatments showed appreciably lower levels of L. monocytogenes compared to the untreated (control) samples. Lastly, following 24 h of refrigerated storage, the pH of the rinse fluid recovered from hams treated with a 1:2 solution of ACS (pH 5.49 to 5.63) was appreciably (P>0.05) lower than the pH of the rinse fluid recovered from hams treated with a 5% solution of LAE (pH 6.28 to 6.32) or from rinse fluid recovered from hams that were not treated with either compound (pH 6.26). However, as was observed for hams inoculated with ca. 7.0 $\log_{10}$ CFU, there was no statistical difference in the pH of the rinse fluid between the experimental and control hams (both were ca. pH 6.0) after 60 days of refrigerated storage (data not shown).

Conclusions: The present study evaluated both the lethality and inhibition of two food grade chemicals, acidic calcium sulfate and lauric arginate, as applied via the present invention for control of L. monocytogenes on hams during refrigerated storage. Herein, we validated the efficacy of the present invention for reducing levels of L. monocytogenes on the surface of hams by at least 2.0 $\log_{10}$ CFU/ham using a 1:1 or 1:2 solution of ACS and by at least 5.0 $\log_{10}$ CFU/ham using a 5% solution of LAE within 24 h at 4° C. In addition, at a relatively low inoculum level (3.0 $\log_{10}$ CFU/ham) both chemicals applied using the present invention were effective at controlling the outgrowth of L. monocytogenes for at least 40 days of refrigerated storage. In shelf-life studies using an initial inoculum of ca. 7.0 $\log_{10}$ CFU/ham, in general ACS and LAE were successful at controlling the further outgrowth of L. monocytogenes for at least 60 and 28 days of refrigerated storage, respectively.

The present invention displayed considerable potential for controlling L. monocytogenes in RTE meat and poultry products. The results validated herein will allow manufacturers to meet the USDA/FSIS requirements of alternative 2 and perhaps alternative 1 depending on formulation and on the antimicrobial selected and the dose delivered via the present invention. The present invention should also be directly applicable for other products (e.g., uncooked meats) and other packaging systems (e.g., roll stock vacuum packaging equipment which uses a forming film to develop a pocket and a non-forming film that seals the pocket, the antimicrobial could be added either prior to or after the meat is placed in the pocket, but prior to sealing).

INDEX OF THE ELEMENTS

1. Bagging apparatus
2. Product
3. Bag
4. Strike plate
5. Spray wand offset bar
6. Spray wand
7. Rotary shaft
8. Hub
9. Bearings
10. Seal
11. Support
12. Trigger bar
13. Counterweight
14. Offset bar
15. Stop bar
16. Stop
17. Wand nozzle 18. Sensor
19. Bracket
20. Sprayer control unit
21. Wire
22. Solution reservoir
23. Flexible tube
24. Bellcrank
25. Clevis pin
26. Pneumatic cylinder
27. Offset bar
28. Bracket
29. Pin
30. Plate
31. Bolts All of the references cited herein are incorporated by reference in their entirety. Also incorporated by reference in their entirety are the following references: Levine, P., et al., Journal of Food Protection, 64: 118-1193 (2001); Luchansky, J. B., and J. E. Call, Journal of Food Protection, 67: 1017-1021 (2004); Luchansky, J. B., et al., Meat Science, 71:92-99; Stekelenburg, F. K., Food Microbiology, 20: 133-137 (2003). Also incorporated by reference in their entirety are the following U.S. Pat. Nos. 6,113,963; 6,509,050; 5,573,801.

Thus, in view of the above, the present invention concerns (in part) the following:

A system for treating food products, comprising (or consisting essentially of or consisting of) a bagging system, a spray system, and a rotating assembly (for returning a spray wand to a resting position).

The above system, wherein the rotating assembly comprises:
(a) a strike plate operatively connected to a spray wand,
(b) a spray wand offset bar operatively connected to the strike plate,
(c) a rotary shaft operatively connected to the spray wand offset bar,
(d) a hub operatively connected to the rotary shaft, and
(e) a support operatively connected to the hub, wherein the support is operatively connected to a bagging system.

The above system, wherein said spray system is operatively connected to said spray wand.

A method of treating a food product in a container to reduce or inhibit a microbial population on (or in) said food product (or said container), comprising (or consisting essentially of or consisting of) applying to said container an antimicrobial solution wherein said antimicrobial solution is applied in an amount effective to reduce or inhibit said microbial population, and placing said food product in said container.

The above method, wherein the food product is a ready-to-eat meat product or poultry.

The above method, wherein the microbial population is *Listeria monocytogenes, Escherichia coli*, or mixtures of *Listeria monocytogenes* and *Escherichia coli*.

The above method, wherein the container is a shrink-wrap bag.

The above method, wherein the antimicrobial solution is aqueous.

The above method, further involving a vacuum treatment step after placing the food product in the container. The method involving a heat treatment step after the vacuum treatment step.

The above method, wherein the antimicrobial solution is applied in an amount effective to cover the surface of the food product in the container.

The above method, wherein the antimicrobial solution is sprayed into the container simultaneously (or about simultaneously) as the food product is placed into the container.

The above method, wherein the surface of the food product is not treated with antimicrobials prior to being placed into the container.

The above method, wherein the food product is not injected with antimicrobials prior to being placed into the container.

The above method, wherein the food product is injected with antimicrobials prior to being placed into the container.

The above method, wherein the antimicrobial solution contains acidic calcium sulfate, lauric arginate, or mixtures of acidic calcium sulfate and lauric arginate.

The above method, wherein said method utilizes the above system.

The above method, wherein said container is a bag from said bagging system.

The above method according, said method comprising (or consisting essentially of or consisting of) placing said food product on the surface of said bagging system, pushing said food product against said strike plate, moving said spray wand and said food product into said bag, and applying said antimicrobial solution into said bag.

The above method, further comprising (or consisting essentially of or consisting of) removing said food product and said bag from said bagging system.

A method of treating a food product in a container to reduce or inhibit microbial contaminants on [or in] said food product [or said container], comprising (or consisting essentially of or consisting of) applying to said container an antimicrobial solution wherein said antimicrobial solution is applied in an amount effective to reduce or inhibit said microbial contaminants, and placing said food product in said container.

A method of reducing or inhibiting post-processing microbial contamination of a food product in a container, comprising (or consisting essentially of or consisting of) applying to said container an antimicrobial solution wherein said antimicrobial solution is applied in an amount effective to reduce or inhibit said post-processing microbial contamination, and placing said food product in said container.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A system for treating food products comprising:
an antimicrobial solution;
a food package; and,
an antimicrobial solution dispenser structured so that the dispenser selectively extends into the package:
wherein movement of a food product into the package displaces the dispenser so that the dispenser simultaneously extends into the package and automatically dispenses an effective amount of the antimicrobial solution.

2. The system of claim 1 wherein the antimicrobial solution is metered so that only the effective amount of the antimicrobial solution is dispensed.

3. The system of claim 2 wherein the antimicrobial solution dispensed is controlled by a control unit.

4. The system of claim 1 wherein the dispenser comprises an elongated wand assembly, the food product engaging the wand assembly as the food product moves into the food package.

5. The system of claim 1 wherein the package comprises a bag so that as the food product moves into the bag the dispenser extends into the bag and simultaneously dispenses the antimicrobial solution into an interior of the bag.

6. The system of claim 5 wherein the dispenser is structured and deployed so that the dispenser primarily dispenses the antimicrobial solution in a rear portion of the bag and not on the food product.

7. The system of claim 1 further comprising a reset apparatus that automatically returns the dispenser back to a rest position after the food product is removed from the system.

8. The system of claim 7 wherein the reset apparatus comprises a counterweight.

9. The system of claim 7 wherein the reset apparatus comprises a pneumatic cylinder.

10. A system to reduce or inhibit the formation of a microbial population on a food product wherein as the food product enters a bag, a dispenser simultaneously extends into the mouth of the bag and sprays an antimicrobial solution into the bag so that when the mouth of the bag is closed, the antimicrobial solution treats the food product in the bag wherein the food product contacts and displaces the dispenser as the food product enters the bag, the dispenser simultaneously dispensing antimicrobial solution as the food product moves into the bag.

11. The system of claim 10 wherein the dispenser automatically resets to receive a next food product.

12. The system of claim 10 wherein the food product comprises a ready-to-eat product.

13. The system of claim 12 wherein the food product comprises meat.

14. The system of claim 10 wherein after the product is in the bag, the bag is vacuum sealed by a vacuum sealing system, and heat treated by a heat treatment system.

* * * * *